United States Patent
Bornstein et al.

[11] Patent Number: 6,060,177
[45] Date of Patent: May 9, 2000

[54] METHOD OF APPLYING AN OVERCOAT TO A THERMAL BARRIER COATING AND COATED ARTICLE

[75] Inventors: Norman S. Bornstein, West Hartford; Raymond F. Zatorski, East Hampton, both of Conn.

[73] Assignee: United Technologies Corporation, Hartford, Conn.

[21] Appl. No.: 09/026,240

[22] Filed: Feb. 19, 1998

[51] Int. Cl.[7] ................................................. B21D 39/00
[52] U.S. Cl. ..................... 428/623; 428/633; 416/241 B
[58] Field of Search ..................... 428/615, 623, 428/632, 633, 663, 670, 668, 680; 416/241 B, 241 R

[56] References Cited

U.S. PATENT DOCUMENTS

| | | | |
|---|---|---|---|
| 4,405,659 | 9/1983 | Strangman | 427/248.1 |
| 4,738,227 | 4/1988 | Kamo et al. | 123/23 |
| 4,808,487 | 2/1989 | Gruenr | 428/610 |
| 5,034,284 | 7/1991 | Bornstein et al. | 428/680 |
| 5,169,674 | 12/1992 | Miller | 427/456 |
| 5,236,787 | 8/1993 | Grassi | 428/552 |
| 5,245,264 | 9/1993 | Kojima | 415/200 |
| 5,305,726 | 4/1994 | Scharman | 123/668 |
| 5,338,577 | 8/1994 | Burdette | 427/453 |
| 5,350,599 | 9/1994 | Rigney | 427/255.7 |
| 5,562,998 | 10/1996 | Strangman | 428/612 |
| 5,624,721 | 4/1997 | Strangman | 427/585 |
| 5,660,885 | 8/1997 | Hasz | 427/374.5 |
| 5,683,825 | 11/1997 | Bruce et al. | 428/698 |
| 5,740,515 | 4/1998 | Beele | 428/552 |
| 5,773,141 | 6/1998 | Hasz et al. | 428/335 |
| 5,900,326 | 5/1999 | Bornstein et al. | 428/632 |

FOREIGN PATENT DOCUMENTS

WO 96/31687  10/1996  WIPO.

*Primary Examiner*—Timothy Speer
*Assistant Examiner*—Bryant Young
*Attorney, Agent, or Firm*—F. Tyler Morrison

[57] ABSTRACT

An overcoat is applied over thermal barrier coatings such as YSZ or other columnar grain ceramic. The exposed surface of the TBC is prepared to ensure that it is clean and has a proper roughness. The surface is then heated and an overcoat material such as a solid solution of chromia and alumina is deposited on the exposed surface, for example by plasma spraying to form a continuous overcoat on the TBC. The overcoat is preferably corrosion and erosion resistant, and inhibits the migration of oxygen to the underlying TBC and alumina layer.

20 Claims, 2 Drawing Sheets

METHOD OF APPLYING AN OVERCOAT TO A THERMAL BARRIER COATING AND COATED ARTICLE

TECHNICAL FIELD

The present invention relates generally to thermal barrier coatings (TBCs), and relates more particularly to overcoating TBCs to enhance the integrity of the TBC and the corresponding lifespan of the underlying component.

BACKGROUND

It is known to apply TBCs, such as yttria stabilized zirconia (YSZ) to external surfaces of air-cooled components, such as air-cooled turbine components. U.S. Pat. No. 4,405,659 to Strangman describes one such application, is assigned to the assignee of the present invention and is expressly incorporated by reference herein. In Strangman, a thin, uniform metallic bonding layer, e.g., between about 1–10 mils, is provided onto the exterior surface of a metal component, such as a turbine blade fabricated from a superalloy. The bonding layer may be a MCrAlY alloy, intermetallic aluminide or other suitable material. A relatively thinner layer of alumina, on the order of about 0.01–0.1 mil, is formed by oxidation on the bonding layer. Alternatively, the alumina layer may be formed directly on the alloy without utilizing a bond coat. The TBC, such as yttria stabilized zirconia, is then applied to the alumina layer by vapor deposition or other suitable process in the form of individual columnar segments, each of which is firmly bonded to the alumina layer of the component, but not to one another. The underlying metal and the ceramic TBC typically have different coefficients of thermal expansion. Accordingly, the gaps between the columnar segments enable thermal expansion of the underlying metal without damaging the TBC.

Over the operational life of a TBC coated component, and particularly during operation in extreme temperature environments such as are found in aircraft, the TBC exhibits failure by spalling. Failure of the TBC is related to the magnitude of the stresses associated with the inevitable growth and thickening of the alumina layer, which in turn relates to the quantity of oxygen that migrates to the interface, either through the ceramic material or via the gaps formed between the columnar grains. In aircraft applications, the rate of growth of the alumina layer is relatively slow. Consequently, TBC treated components typically tend to have reasonable service lives, although further increases are desirable.

While it is not fully understood, the relatively thin alumina layer is believed to be necessary to and responsible for the adherence of the subsequently applied TBC. It is known that the alumina layer helps protect the underlying bond coat and substrate against oxidation and corrosion, and that the TBC helps reduce corrosion of the underlying bond coat (if any) and metal by covering the bond coat and acting as a buffer between the bond coat and environmental contaminants. It is also known that the alumina layer inevitably grows and thickens over time in the presence of oxygen, and that a relatively thick alumina layer promotes spalling of the TBC. Since zirconia is relatively transparent to oxygen, a YSZ TBC does not play a major role in protecting against oxidation of the alumina layer.

As is apparent from the Strangman '659 patent, it is highly undesirable to attenuate corrosion or oxidation simply by applying a ceramic TBC so as to completely cover the bond coat, e.g., to eliminate the gaps between columnar grains. Such an arrangement would result in different rates of thermal expansion between the metal and ceramic, with rapid failure of the TBC upon thermal cycling of the component. It is similarly undesirable to initially generate a thicker alumina layer, which would promote the above-discussed earlier failure of the TBC by spalling.

However, erosion also contributes to the failure of TBCs. Aviation grade fuel is relatively free of impurities that form particulates and increase erosion of the TBC. Corrosion can also cause failure of the TBC and the underlying component.

In industrial turbine environments, in which the turbine components generally lack TBCs for economic reasons and because industrial gas turbines have historically run at lower temperatures, components routinely encounter erosion causing particulates and corrosive materials debris. This matter includes alkali rich salts such as alkali sulfates, which are indigenous to the operating environment, and products such as combustion products from burning fuel with a relatively high level of impurities. The alkali rich salts eventually condense on the exposed surfaces of the components and substantially shorten the life of the component. The fused salt corrodes alloys by dissolving the surface oxide scale. This corrosion is referred to as sulfidation attack or hot corrosion, and also leads to the above-noted failure by spalling. Failure resulting from corrosion has plagued the industrial turbine industry for many years.

One manner of protecting industrial turbine components from sulfidation attack is the generation of chromia directly to the exposed metal surface of the component, e.g., by chromize pack coating or diffusion directly into the substrate. However, chromia protection is not appropriate in relatively high temperature operating environments, such as are found in aircraft turbines. Above about 900° C., chromia is unstable and reacts with available oxygen to form the volatile compound CrO3. In aircraft, air cooled turbine components routinely operate in environments above about 1350° C. Accordingly, one skilled in the art would not use chromia to protect aircraft turbine components.

Where a TBC coated component has been exposed to alkali salts, it has been observed that the alkali salts will interact with the ceramic material and accelerate the growth of the alumina layer at the interface, although such action is not fully understood. To the best of our knowledge, no one has applied an overcoat to a TBC in an effort to attenuate corrosion or oxidation.

It is an object of the present invention to apply an overcoat to an article having a TBC to inhibit oxygen from migrating to the bond coat, and thereby attenuate the growth of the alumina layer and extend the service life of the article.

It is also an object of the invention to apply a corrosion-resistant overcoat to an article having a TBC.

SUMMARY OF THE INVENTION

The present invention relates to overcoating TBCs to enhance the integrity of the TBC and the corresponding lifespan of the underlying component According to one aspect of the present invention, a superalloy component is disclosed. The article includes a superalloy substrate; an alumina layer on the substrate, which layer may be formed as part of a bond coat; an adherent columnar layer of ceramic material forming a thermal barrier coating on the alumina layer; and an overcoat layer applied to the thermal barrier coating.

According to another aspect of the present invention, a method is disclosed for applying an overcoat to an article having a columnar ceramic TBC. The TBC includes relatively small gaps between adjacent columns.

The method includes preparing an exposed surface of the TBC in order to remove debris and contaminants from the exposed surface and to ensure a predetermined roughness of the exposed surface. A layer of material is then applied in particulate form to the exposed surface, for example by plasma spraying, to overlie the columnar ceramic coating and the gaps so as to form a corrosion resistant, oxygen resistant overcoat on the thermal barrier coating.

One advantage of the present invention is that the overcoat prevents the migration of oxygen to the underlying alumina layer. Where the overcoat is composed of alumina and chromia, the migration is lowered by several orders of magnitude with a corresponding extension of component life.

Another advantage of the present invention is that the overcoat resists corrosion, particularly where the overcoat includes chromia. The overcoat thereby extends the life of the component.

Still another advantage of the present invention is that the overcoat enhances the erosion resistance of the component. For an overcoat composed of alumina and chromia, erosion resistance is enhanced by about an order of magnitude.

Additional advantages will become apparent to those skilled in the art in view of the following description and attached drawings.

DETAILED DESCRIPTION OF THE PREFERRED EMBODIMENTS

Figure 1:
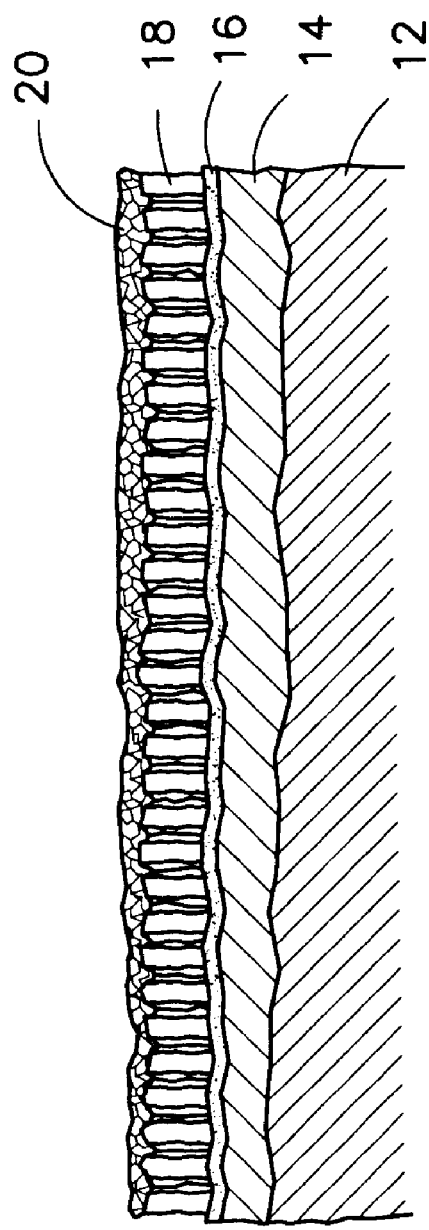
FIG. 1 is a cross sectional line drawing of an article having a TBC and an overcoat in accordance with the present invention.

Turning now to FIG. 1, a portion of a superalloy component having a thermal barrier coating (TBC) and an overcoat in accordance with the present invention is illustrated generally by the reference numeral 10. U.S. Pat. No. 4,405,659 to Strangman and U.S. Pat. No. 5,087,477 to Giggins et al. generally describe the application of a bond coat and TBC to a component, such as an air cooled turbine component made from a superalloy. While Strangman and Giggins et al. generally discuss TBCs applied to yttria stabilized zirconia (YSZ) and while tests performed in connection with the present invention have utilized a component with a TBC composed of YSZ, the present invention may equally be employed with TBCs composed of other materials.

A substrate 12, for example a superalloy component, is coated with a layer 14 of MCrAlY, intermetallic aluminide or other suitable material. Preferably although not necessarily, the layer thickness is between about 2 to 10 mils and is uniform. The layer may also be treated, e.g., by peening and/or heat treating, to density any voids and to improve the structure of the coating. Generally, an alumina layer 16 is then formed on the bond coat 14. Alternatively, the alumina layer may be formed after application of the TBC or directly on the substrate without utilizing a bond coat. The TBC 18, e.g., a ceramic material such as YSZ, is then deposited on the bond coat, for example by electron beam physical vapor deposition (EB-PVD). As noted above, ceramic TBCs and the underlying metal have different coefficients of thermal expansion, and thus the TBC will tend to crack over time. The cracks facilitate migration of oxygen and corrosives, and hasten failure of the TBC. Accordingly, the invention will be beneficial for TBCs composed of other than YSZ, or applied by methods other than EB-PVD.

The present invention includes depositing an overcoat 20 onto the TBC 18. Preferably, although not necessarily, the overcoat is a solid solution of chromia and alumina. The overcoat must be thick enough to cover the TBC and function as intended, but not so thick as to spall during thermal cycling. Moreover, the weight of a thicker overcoat, especially when summed over a number of blades, adds significant rotating mass, and thus it is desirable to apply an overcoat that is just thick enough to function as intended. For an alumina- chromia overcoat, we believe that the overcoat should be between about 2–10 mils thick and more preferably between about 2–5 mils thick. It is believed that a thicker overcoat will function as intended, but that thicker overcoats may tend to spall during thermal cycling.

We have determined that the application of an overcoat of chromia and alumina to a TBC provides not only resistance to sulfidation attack and corrosion, but surprisingly also inhibits oxygen from reaching the interface of the TBC and underlying alumina layer. Accordingly, the overcoat provides both resistance against corrosion and oxidation, thereby significantly extending the operational life of the component.

Having generally described the overcoat, a method of applying an overcoat to a component having a TBC is now described. The exposed surface of the TBC is preferably prepared to ensure proper bonding of the overcoat to the TBC, and the overcoat is then applied in any suitable manner, such as by arc plasma spraying.

Initially, it is important that the exposed surface of the TBC is clean, e.g., free from debris and oils which are deposited during handling of the component. It is well known to clean the exposed surface of a metal component, either with a cleaning solution or "self cleaning" the component by heating to a predetermined temperature prior to applying a coating. However, it is generally not known that the exposed surface of a ceramic material such as YSZ TBC is not self-cleaning, and should be cleaned prior to applying another material onto the ceramic. A cleaning solution, such as alcohol or acetone, is applied to the exposed surface of the TBC. The cleaning solution is then removed, preferably but not necessarily by heating the component in an oven sufficiently to dry the exposed surface. While the temperature to which the part is heated is not critical to the invention, the part should be heated to at least about 65° C. where alcohol or acetone is used.

Once the exposed surface of the TBC is clean, the roughness is checked. As discussed below and with respect to an overcoat composed of alumina-chromia applied by arc plasma spraying, it has been found that some chemical bonding occurs but that the primary bonding mechanism is mechanical bonding. If the surface is too smooth or too rough or wavy, the overcoat material may not bond to the surface during arc plasma spraying. Accordingly, proper surface roughness ensures satisfactory bonding of the overcoat to the TBC.

The surface roughness of the TBC is measured to determine actual roughness, for example using a profilometer set for at least 0.100 inches of travel, with a waviness cutoff set at about 0.030 inches. Numerous other acceptable measuring methods are available. An acceptable average roughness is between about 80–125 microinches and preferably about 100 microinches (RMS). If the measured roughness is less than the acceptable roughness by more than a given amount, then the surface is too smooth and the overcoat may not properly adhere to the TBC. The surface is roughened to the acceptable average roughness. If the measured roughness exceeds the acceptable roughness, then the surface should be polished to within the acceptable average roughness.

Grit blasting is one satisfactory manner for treating the TBC surface, and other manners are also available. In one instance, a surface was polished by grit blasting with 60 grit alumina grit delivered at 25 p.s.i. using a suction type blaster. The nozzle was separated from the surface by about 4 inches, and grit blasting occurred for about 1–2 minutes. A size range of media is between about 40 grit to about 100 grit, with 60 grit being preferred, although an even greater range and other grit materials should also provide acceptable results. By varying media and delivery parameters, grit blasting has been used to polish or to roughen a surface.

After the exposed surface of the TBC has been prepared, the overcoat is applied. While the below-described overcoat application is by plasma spraying, other delivery methods such as arc transfer or sputtering may be employed with equal effect.

The exposed, prepared surface of the TBC is first preheated. Dye penetrant inspection tests indicate significant overcoat cracking in components which are not preheated. The entire surface which is to receive the overcoat is preheated to about 500° C., and it is important to avoid localized heating. The size or geometry of the part may dictate the method of preheating the part. While preheating using heating torches or the plasma gun may be appropriate for smaller parts, e.g., smaller than about 4 inches, larger parts may need to be preheated using external torches to avoid localized heating.

Once the exposed surface of the TBC is adequately preheated, the overcoat is applied. While the following description relates to the application of a solid solution of chromia and alumina, other materials may be employed with similar or equal effect. Chromia and alumina are mutually soluble, and it believed that mutual solubility is an important characteristic of the overcoat components. In addition, the thermal expansion of chromia is similar to that of the underlying zirconia TBC, which reduces the likelihood of cracking and spallation due to thermal cycling.

As noted above, the preferred overcoat is a solid solution of chromia and alumina. The material is supplied to the plasma spray gun in powder form. Particle size of the solid solution is important, as is the composition of the solution. The mean particle size should be between about 15–45 microns, and preferably is about 25 microns. At the maximum mean particle size, the particles should be between about 20–100 microns, while at the minimum mean particle size the particle should be between about 5–25 microns. At the preferred mean particle size, the particles should be about 15–45 microns. As the mean particle size is reduced below about 15 microns, the resultant overcoat exhibits over-densification and cracking during subsequent thermal cycling. As the mean particle size exceeds about 45 microns, the coatings are characterized by excessive porosity and roughness. The above particle sizes were determined using a laser particle size analyzer, such as the Microtrack analyzer by Leeds & Northrop.

With respect to composition, the powder is composed of between about 55 w/o to 93 w/o of chromia and respectively about 45 w/o to 7 w/o alumina, with the preferred composition being about 70 w/o chromia and 30 w/o alumina. Note that the preceding range is preferred, and that compositions outside of this range should result in powders that form functional overcoats.

The chromia and the alumina are preferably mixed by fusing and crushing to ensure thorough mixing, although other methods of mixing should provide acceptable results. However, mechanical mixes or agglomerations of the powder are not thorough enough for chromia and alumina. Such mixes result in an overcoat characterized by islands of alumina or chromia, which have coefficients of thermal expansion different than that of the bulk coating, and promotes spalling or severe cracking and early failure during thermal cycling.

EXAMPLE 1

Powder having the preferred mean particle size was applied by arc plasma spray using a model 9MB Metco spray gun with air jets, a GH nozzle and Number 2 powder port with a separation from the nozzle to the component of between about 2.5–3.0 inches, and in accordance with the following parameters. The primary gas was argon, supplied at about 100 p.s.i. and at a rate of 80 standard cubic feet per hour (scfh). The secondary gas was also argon, supplied at 75 p.s.i. and at a rate of 15 scfh. Power was supplied at 550 A and between 65–70 V, with the voltage being adjusted by altering the flow of secondary gas by ±5 scfh.

The powder was fed to the gun by a Sultzer Twin 10C, a Metco 3MP or a Metco 4MP feeder, with argon as the carrier gas. The carrier gas was fed at a rate of 5.5 scfh, and fed powder at a rate of 8 lbs./hr. The air jets were arranged in parallel, and operated at 40 p.s.i.

A Metco 7MB or 3MB can also be used with the above parameters.

EXAMPLE 2

Powder having the minimum mean particle size was applied by arc plasma spray using a model 9MB Metco spray gun with air jets, a GP or a 733 nozzle and Number 2 powder port with a separation from the nozzle to the component of between about 3.0—3.5 inches, and in accordance with the following parameters. The primary gas was argon, supplied at about 100 p.s.i. and at a rate of 125 scfh. The secondary gas was also argon, supplied at 50 p.s.i. and at a rate of 15 scfh. Power was supplied at 500 A and between 65–70 V, with the voltage being adjusted by altering the flow of secondary gas by ±5 scffh.

The powder was fed to the gun by a Sultzer Twin 10C, a Metco 3MP or a Metco 4MP feeder, with argon as the carrier gas. The carrier gas was fed at a rate of 8 scffh to feed powder at a rate of 6 lbs./hr. The air jets were arranged in parallel, and operated at 60 p.s.i.

A Metco 7MB or 3MB can also be used with the above parameters.

EXAMPLE 3

Powder having the maximum mean particle size was applied by arc plasma spray using a model 9MB Metco spray gun without air jets, but with a GH nozzle and Number 2 powder port with a separation from the nozzle to the component of between about 2.5–3.0 inches, and in accordance with the following parameters. The primary gas was argon, supplied at about 100 p.s.i. and at a rate of 80 standard cubic feet per hour (scfh). The secondary gas was also argon, supplied at 75 p.s.i. and at a rate of 15 scfh. Power was sullied at 550 A and between 70–75 V, with the voltage being adjusted by altering the flow of secondary gas by ±5 scfh.

The powder was fed to the gun by a Sultzer Twin 10C, a Metco 3MP or a Metco 4MP feeder, with argon as the carrier gas. The carrier gas was fed at a rate of 5.5 scfh and fed powder at a rate of 8 lbs./hr.

As noted above, tests of plasma sprayed, chromia-alumina overcoats indicate that the primary bonding mechanism appears to be mechanical bonding. This fact supports the finding that TBC surface preparation is important in obtaining a satisfactory overcoat, particularly surface roughness.

Figure 2:
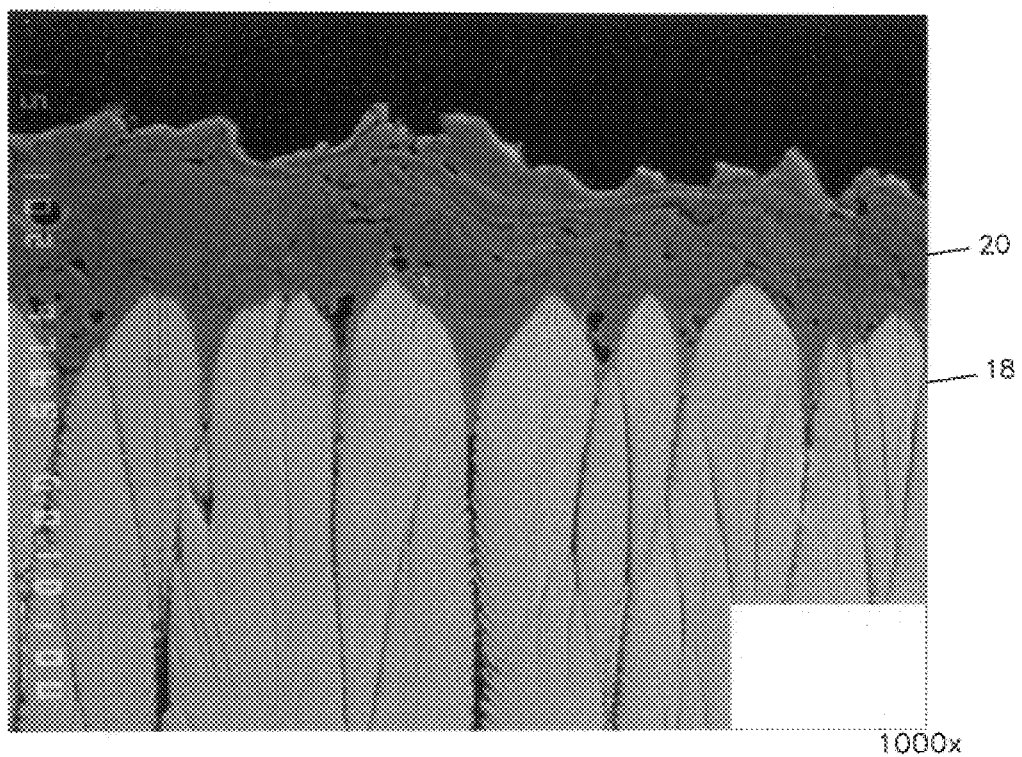
FIG. 2 is a photomicrograph of the article of FIG. 1, illustrating in greater detail a TBC and the overcoat.

With reference to FIG. 2, the overcoat 20 covers the TBC 18, but does not extend far down into the gaps defined between the individual columnar grains. In this manner, the overcoat can effectively bond to and expand with the TBC, without locking the TBC grains into fixed relation with one another which would promote failure upon thermal cycling. Moreover even if portions of the overcoat do crack, substantially all of the TBC remains covered by the overcoat, thus restricting passage of oxygen into the YSZ by orders of magnitude compared to non-overcoated TBCs.

In one test, ceramic specimens were subjected to corrosion testing. The specimens included a solid solution of (a) pure alumina on one set of specimens, (b) 60 w/o alumina and 40 w/o chromia on another set of specimens, and (c) 40 w/o alumina and 60 w/o chromia on an additional set of specimens. The specimens were then coated with fused alkali sulfates and exposed for 50 hours at about 1000° C.

As noted above, the fused salt corrodes alloys by dissolving the surface oxide scale. In the case of alumina, the reaction is $O^-+Al_2O_3=2AlO_2^-$.

In the case of yttria, the reaction is $O^-+Y_2O_3=2YO_2^-$.

The presence of chromia attenuates the corrosive action of the fused salt according to the following reaction $Cr_2O_3+2 O^-+3/2O_2=Cr_2O_4^-$ As is apparent from the preceding equation, the chromia removes oxygen ions. In addition, the chromia also forms an azeotrope with the sulfates. The azeotrope is more volatile than its constituents, and thus hastens the evaporation of the corrosive salt.

The fused alkali salt also corrodes the TBC. In the case of a TBC comprising YSZ, one of the products of the reaction is $NaYO_2$. Accordingly, some of the specimens were coated with fused alkali salt and immersed separately in samples of distilled water, in order to determine the nature of any ions. The specimens coated with pure alumina produced ions of sodium, yttrium and sulfate, indicating thatcorrosion had occurred.

The specimens coated with a solid solution of chromia and alumina produced ions of sodium, chromium and sulfate. The solution turned yellow, confirming the presence of the chromate ions. The absence of soluble yttria indicates that corrosion had not occurred. Moreover, it was determined that substantially all of the applied salt had evaporated from the surface of the TBC.

As noted above, erosion also degrades the integrity of TBCs. It was found that overcoating the TBC increased the erosion resistance of the component by about an order of magnitude, in addition to significantly increasing the corrosion resistance of the component. Moreover, it has been determined that an overcoat of chromia and alumina provides a darker color layer than the YSZ TBC. The coating therefore enhances black body radiation of heat from the coating, and further reduces the temperature of the underlying component.

While the present invention has been described above in some detail, numerous variations and substitutions may be made without departing from the spirit of the invention or the scope of the following claims. For example, it may be desirable to vary the coating composition through the overcoat thickness so as to provide pure chromia on the exposed surface on the overcoat. Accordingly, it is to be understood that the invention has been described by way of illustration and not by limitation.

What is claimed is:

1. A superalloy component comprising:
    a superalloy substrate;
    an alumina layer on the substrate;
    an adherent columnar layer of ceramic material forming a thermal barrier coating on the alumina layer; and
    an overcoat layer applied to the thermal barrier coating, the overcoat layer composed of chromia and alumina.

2. An article according to claim 1, wherein the overcoat layer has a thickness of between about 2–20 mils.

3. An article according to claim 2, wherein the overcoat layer has a thickness of between about 2–4 mils.

4. An article according to claim 1, wherein the overcoat layer is composed of a solid solution of chromia and alumina.

5. An article according to claim 4, wherein the overcoat layer is composed of between about 55 w/o to 93 w/o chromia and respectively 45 w/o to 7 w/o alumina.

6. An article according to claim 1, wherein the overcoat layer is applied by plasma spraying a powdered material onto the thermal barrier coating.

7. An article according to claim 1, wherein the overcoat layer is applied by sputtering material onto the thermal barrier coating.

8. An article according to claim 1, wherein the composition of the solid solution is varied through the thickness of the overcoat so that the overcoat contains more chromia near the outer surface of the overcoat than at the TBC.

9. An article according to claim 1, wherein the overcoat layer comprises a corrosion resistant material.

10. An article according to claim 1, wherein the overcoat layer comprises an oxygen inhibiting material.

11. A superalloy article having bond coat with an alumina layer and a columnar ceramic, a thermal barrier coating on the alumina layer, the coating defining gaps between adjacent columns, and the article made in accordance with the method comprising the steps of:
    preparing an exposed surface of the thermal barrier coating in order to provide a predetermined roughness of the exposed surface and to remove debris and contaminants from the exposed surface; and
    applying composed of chromia and alumina a layer of material onto the exposed surface so as to overlie the columnar ceramic coating and the gaps and form a continuous overcoat on the thermal barrier coating.

12. The article according to claim 11, wherein the predetermined roughness is between about 80–125 microinches.

13. The article according to claim 11, wherein the step of preparing the exposed surface comprises measuring the roughness of the exposed surface; determining the difference between the predetermined roughness and the measured roughness; and polishing or roughening the exposed surface based upon the difference until the roughness is about equal to the predetermined roughness.

14. The article according to claim 11, wherein the overcoat is composed of chromia and alumina.

15. The article according to claim 11, wherein the step of applying is performed using a process selected from the group consisting of plasma spraying, sputtering, and arc transfer.

16. The article according to claim 11, wherein step of applying is performed until the overcoat is between about 2–10 rails thick.

17. The article of claim 11, wherein the composition is composed of a solid solution which is varied during the step of applying so that the overcoat contains more chromia near the outer surface of the overcoat than at an interface defined between the TBC and the overcoat.

18. The article according to claim 11, wherein the overcoat is a corrosion resistant material.

19. The article according to claim 11, wherein the overcoat is composed of a material which prevents migration of oxygen to the thermal barrier coating and the alumina layer.

20. The article according to claim 11, wherein the overcoat is composed of an erosion resistant material.

* * * * *